Patented Dec. 10, 1935

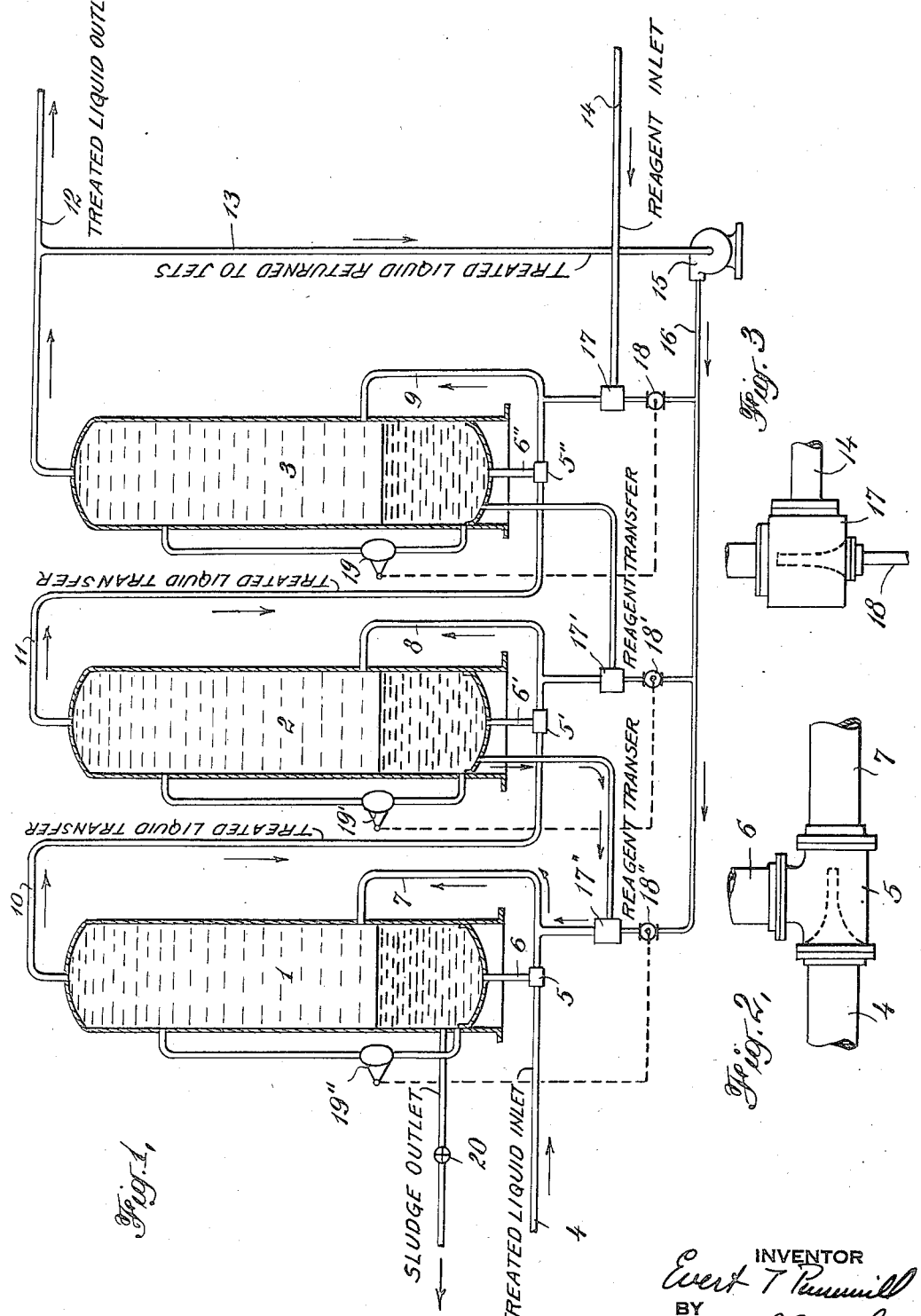

2,023,546

UNITED STATES PATENT OFFICE 2,023,546

METHOD OF CONTACTING LIQUIDS

Evert T. Pummill, Augusta, Kans., assignor to Socony-Vacuum Oil Company, Incorporated, New York, N. Y., a corporation of New York Original application August 25, 1932, Serial No. 630,391. Divided and this application August 19, 1935, Serial No. 36,924

1 Claim. (Cl. 196—45)

This application is a division of my copending application Serial No. 630,391, filed August 25, 1932.

This invention has to do with methods of control for treating systems wherein one liquid is contacted with another. Specifically, it has to do with the control of the movement of reagent from one vessel to another in a continuous series of such vessels and with the proportioning of reagent originally fed to the system.

The invention is applicable to any system treating a liquid with another liquid of different specific gravity, and where the use of specific liquid is mentioned in this specification it is not intended that the specification shall be limited by such recitation.

The present form of the invention is designed for use in the treatment of petroleum products, broadly hereafter referred to as oil, with sulphuric acid, and the discussion will for convenience be confined to such system.

In the treatment of oil with acid there has been developed a system made up of several units, in each of which the oil to be treated is contacted with a mixture of acid and acid sludge in such a manner that the sludge-acid mixture is employed in a volume much in excess of the volume of oil to be treated. From each of these units a settled oil is withdrawn to be passed to a further unit of the series and there contacted with a sludge-acid mixture of greater strength. From each of the units sludge-acid mixture is withdrawn to be passed to the next in series, but countercurrent to the oil sequence; and to each unit stronger sludge-acid mixture is supplied from the unit prior in series.

Such a system is set forth in United States Patent 1,652,399 to S. J. Dickey, in United States Patent 1,625,195 to S. J. Dickey, and in United States Patent 1,792,003 to S. J. Dickey.

Other systems less elaborate comprise merely a series of tanks or separating vessels through which the oil to be treated passes in one direction while the reagent passes through the series in the opposite direction being pumped by manually controlled pumps from one vessel to another. It will be noted that in both the older system and the system shown by Dickey, in his several patents previously referred to, there are a plurality of points for manual control and this presents inherent difficulties in keeping the operation in balance resulting in costly attention. Not only does lack of balance in such systems result in a loss of smooth working, but it frequently results in damage to the treated product.

It is an object of this invention to provide a method of operation wherein the original proportioning and the proportional transfer of reagent in such a system is subject to a simple accurate and flexible control.

For the purposes of the present specification, the system of control presented by this invention is represented as operating upon a treating system similar to that of Dickey, in his several patents previously referred to. It is equally applicable without great modification to any other similar system or in fact to any system wherein one liquid is countercurrently treated with another. The drawing showing an oil treating system with the attached control method of this invention is attached to and made a part of this specification. In the drawing, vessels 1, 2, and 3 are separating vessels. Oil to be treated enters from outside the system under gravity head or pump pressure and passes through fitting 5, an enlarged detail of which is shown. This fitting consists of a body 5 into which line 4 leads, ending in a jet. Entering the body 5 is a line 6 connected to the body of the separating vessel 1. Due to the jet action of the entering oil a quantity of the separated reagent or sludge-acid mixture in the bottom of separating vessel 1 is withdrawn and mixed with the oil and the mixture passes on through line 7 to enter separating vessel 1 about midway if its height. By a proper control or adjustment of the sizes of jets and orifices, it is possible to contact with the oil a relatively great volume of sludge-acid mixture. The oil and sludge-acid are allowed to separate by settling in the separator vessel 1 and the oil passes through line 10 to a similar treatment in separator vessel 2 and from thence by line 11 to a similar treatment in separator vessel 3. Fittings 5' and 5'' are the same as fitting 5; line 6' and 6'' exercise the same function as line 6; lines 8 and 9 exercise the same function as line 7. Treated oil leaves the system (which may be composed of any suitable number of separator vessels though here shown as only three) through line 12 and passes to storage. A portion of it is withdrawn through line 13 for actuating the transfer of reagent as hereinafter explained and as set forth in Dickey, in his several patents previously referred to. Fresh reagent enters the system from an outside source through line 14 and passes into fitting 17. Treated oil from line 13 is placed under pressure by pump 15 and distributed through line 16. Entry of reagent into the system is actuated by a jet of this treated oil entering fitting 17 through valve 18 and there entraining reagent from line 14 which it discharges into line 9. Due to the constant addition of reagent to the separating vessel last in the series, the level of reagent or sludge-acid would build up in this vessel if its withdrawal were not controlled. To control this withdrawal I have provided a liquid level control device 19 acting upon the effective interface between the two liquids in separating vessel 3. There is no actual interface in separating vessel 3, the mixture merely becoming more and more concentrated as regards sludge-acid toward the bottom and more and more concentrated as regards oil toward the top, but by equipping float chamber 19 with connections, one of which leads to the region where there is the most concentrated sludge-acid and the other to the region where there is the cleanest oil I am enabled to establish an actual interface in the float chamber which occupies the same position as the effective interface in the separating vessel. In this float chamber I provide a float, floating upon the interface and by this float I actuate valve 18. Liquid level controls of this type are well known and many forms of linkage between the valve and float are used. They may for instance be an actual linkage of levers, or the float may actuate a valve admitting compressed air to a diaphragm which operates the main valve, or electrical connections and motors may be used. All these methods are well developed, all are widely used, and any may be used herein. They form no portion of this invention, and for simplicity of drawing are designated merely by dotted lines connecting each float and the valve it operates. Similar liquid level float controls are provided for separator vessels 1 and 2 at 19' and 19" acting upon valves 18' and 18". A valved line 20 is provided for withdrawing spent sludge-acid from separator vessel 1, the amount of spent sludge-acid so withdrawn is adjusted in proportion to the amount of untreated oil entering through line 4. This adjustment may be made automatic by means of commercial instruments for controlling ratios. When sludge is withdrawn from separator vessel 1, a decrease in level actuates float control 19" which in turn opens valve 18", causing the transfer of sludge-acid from separator vessel 2 to separator vessel 1. In a similar manner separator vessel 2 will adjust its content of sludge-acid by withdrawing sludge-acid from separator vessel 3. Separator vessel 3 will in turn replenish its supply by drawing fresh acid from line 14. In this manner adjustment of the valve in line 20 regulates the proportion of acid to oil throughout the entire system, doing away with the ineffective manual control heretofore found necessary. It is also possible for this system to be operated in a slightly different manner. The amount of acid drawn from line 14 may be regulated in proportion to the amount of oil passed through line 4, in which case the liquid level controller on each separator vessel would operate to control the withdrawal of the sludge-acid from the vessel to which it is connected rather than the reverse as in the above explanation. It is apparent that the method of operation herein disclosed is capable of controlling accurately and simply the proportions and conditions of contact of one liquid with another in any system of countercurrent treatment wherein two non-miscible liquids of differing specific gravities are made use of. While the method has been designed primarily for the treatment of oil and the example and explanation given are pertinent to that art, the method is capable of working with any system of non-miscible liquids of different specific gravities. Accordingly, I claim this method in its broadest equivalents except as limited by the following claim.

I claim:

The process of treating liquid with a liquid reagent largely non-miscible therewith and differing in specific gravity therefrom, comprising establishing a plurality of pools of liquid formed into upper and lower layers consisting principally of the liquid being treated and the reagent respectively passing the liquid to be treated from a source of supply to one of the pools withdrawing reagent from said one pool and commingling the same with the liquid to be treated during its passage to the said pool; permitting the separation in the pool of the reagent and the thus treated liquid, withdrawing and passing liquid from said upper layer to and through successive pools of the said plurality of pools while commingling the same with reagent withdrawn from each pool prior to its introduction into that pool and permitting separation of the liquid and reagent in the respective pools, introducing fresh liquid reagent into the last of the pools in the series, maintaining an effective interface between the layers in each pool at a predetermined level, effecting the passage of reagent from the lower layer in each of the pools to the next preceding pool upon the lowering of the effective interface in the preceding pool, and withdrawing used reagent from said one pool in such quantity as to assure a desired processing of the liquid with the resultant advancement of the reagent from pool to pool as the interface between the layers in each pool is lowered to thereby effect a control over the rate of feed of the reagent to the last pool of the series, and its maintenance in the process during which it is recirculated from and to each of the pools and commingling with liquid under treatment as it is passed thereto.

EVERT T. PUMMILL.